३,२८१,५१९
THREE DIMENSIONAL-TO-PLANAR PROJECTION DISPLAY
Ames F. Giordano, Newark, N.J., assignor to International Telephone and Telegraph Corporation, Nutley, N.J., a corporation of Maryland
Filed Aug. 28, 1962, Ser. No. 219,924
17 Claims. (Cl. 35—10.2)

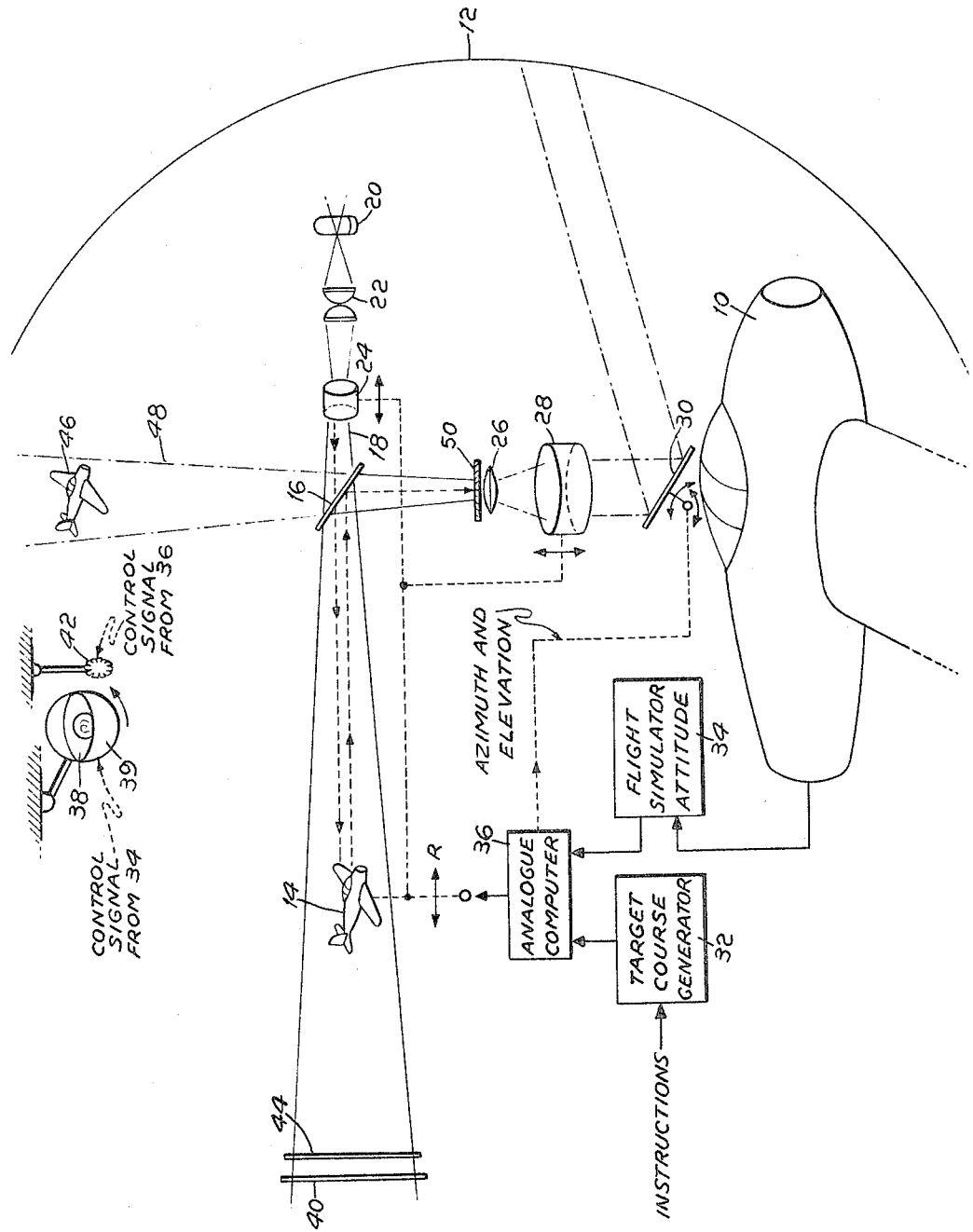

This invention relates to image display systems and more particularly to improved apparatus for projecting movable objects on a screen for use as a training or instruction aid.

Previous display systems utilized in conjunction with aircraft simulators for pilot training have been highly complex, costly, and inefficient. In one such system, projection television apparatus has been used which is inherently limited in resolution and brightness by the cathode ray tube. The latter system also requires very high voltages. Other optical devices use opaque projectors having low brightness levels and include a movable model illuminated by closely positioned large high-power projection lamps which are extremely inefficient. Additional problems are that the heat generated by the lamps imposes limitations on the material forming the model, that the lights must be moved with the model to maintain sufficient brightness and thus require sliding current contacts, and that the model supports and background reflections cause undesirable shadow effects.

It is therefore the primary object of the present invention to provide an improved projection system which eliminates the use of high-power movable lamps associated with the model and permits brighter images of high resolution with greater efficiency.

It is another object to provide a display system wherein the target supports are not visible and heat generation is reduced.

The desired results are achieved by a novel system projecting a divergent light beam through a beam splitter to a target model having a special coating which reflects the light in a highly directive convergent manner back toward the beam splitter. The target image is then further reflected toward the display screen by a pivotable mirror which is automatically controlled in accordance with the relative positions of the target craft with respect to the observer craft.

The details of the invention will be more fully understood and other objects and advantages will become apparent in the following description and an accompanying drawing wherein the single figure shows a schematic view and block diagram of the novel system.

As shown in the figure, a simulated aircraft trainer 10, in which a pilot is seated at the controls, is positioned at a fixed observation point with respect to a standard spherical screen structure 12. A movable target model 14 is illuminated through a beam splitter or transparent mirror 16 by a diverging beam 18 from a stationary light source 20 and lens arrangement 22, 24. Model 14 is coated with a special highly directive lenticular type material formed of minute spherical balls. The balls are made of glass having a high index of refraction of between 1.8 and 2.0 and having diameters in the order of microns, thus appearing as fine grains of powder. With this index of refraction the rear spherical surface reflects the light along the same path as that entering the balls and thus no special backing or screen is required. The surface of model 14 is first prepared with a clear bronzing liquid coating which is permitted to partially dry. The spheres are then randomly applied or dusted on. Upon completion of the drying process, the adhering spheres form a highly directive coating having a reflectivity rating of between 200–300 times that of a standard white mat screen. The model support and gimbal structure are not coated. They therefore reflect no light and remain substantially invisible. Spherical balls of this type have been used in the past in other combinations for other purposes, such as night vision markers and signs, and their highly reflective optical properties are known in the art.

Allowing for some loss through beam splitter 16, the light intensity of the present arrangement compared with that from the usual high-power projection light system would be in the order of 50 to 100 times as great, with 100 foot candles or more being attainable for superposition on simulated day-time scene brightness. The reflected light from the target converges and is directed back along the same path to beam splitter 16 where it is then reflected toward another collecting and focusing lens 26 and through a magnifying lens 28 to a pivotable mirror 30 which projects the target image onto the screen 12. The mirror 30 is centrally located with respect to the spherical screen 12.

The movement of mirror 30 is automatically controlled to display the relative flight position of the target with respect to the trainer craft simulator 10. The position or attitude of target 14 may be remotely controlled by an instructor or automatically programmed. Such information as pitch, roll, yaw, speed, altitude and course of the target are fed in the form of control signals into a target course generator 32, while the simulator craft reference position and pilot's response to these maneuvers by manipulation of the controls of the stationary trainer 10 produce similar signal data which is fed into a flight simulator attitude circuit 34. The outputs of these blocks are then compared by means of known state-of-the-art comparator circuits in an analogue computer 36 which determines the relative range, azimuth and elevation of target 14 with respect to training craft 10. Computer 36 also contains circuitry to develop control signals proportional to the relative range, azimuth, and elevation of said target 14 with respect to craft 10 and applies these signals to suitable known servo and gimbal systems which automatically control the attitude and forward or backward movement of the target 14, as shown by arrow (R), and the elevation and azimuth angular rotations of the mirror 30. The mirror thus projects the relative target attitude and size on the display screen and the appearance of the image, in turn, determines the responsive action which the pilot undertakes. Since only the target and projected image move, the screen appearance takes into account the information from the pilot's reaction at the controls to effectively simulate movement of trainer craft 10.

It should be emphasized at this point that the information fed from target course generator 32 to computer 36 comprises electrical signals corresponding to the pitch, role, yaw, speed, altitude and course of the target model 14. Also, the information fed from flight simulator attitude 34 to computer 36 comprises electrical signals corresponding to the pitch, role, yaw, speed, altitude and course of the training craft 10. In computer 36 the corresponding signals are compared and the appropriate control signals are developed to control target model 14 in such a manner that an image having the proper relative range, azimuth, and elevation with respect to training craft 10 is projected onto screen 12. These functions are performed by standard state-of-the-art techniques, the implementation of which are obvious to one skilled in the art.

As the distance of the target from mirror 16 varies with range, the size of the target, the portion of the divergent light beam that is occupied and the amount of light reflected will also vary. In order to compensate for this change and maintain a constant light intensity on the target and screen, the focal length of lens 24, which may be variable as in a zoom type lens, is automatically adjusted in accordance with the range information. This may be accomplished by suitable linkage to the model or connection to computer 36. Thus, as the target approaches mirror 16 the focal length of the lens 24 is varied to expand the angle of the beam and cover the entire model surface. Further adjustment necessitated by the target range or model position variation is that of lens 28, which maintains optimum focus and supplies magnification of the target image projected on mirror 30. Lens 28 may also be a variable focal length zoom type lens which provides different close-up views or an automatic range variation effect, with a scale factor change being suitably linked to the computer 36.

Additional display features may readily be incorporated in the system. For example, it may be desirable to provide a horizon indication with a brightened sky against a darker ground. For this purpose the horizon generator light source 38 illuminates the upper screen area, with an opaque portion 39 blocking light from the lower screen. The horizon position is determined by information from circuit 34, representing the training craft attitude.

Another requirement may be that the target image appear as a shadow or darkened silhouette against a bright sky. In this instance the target model is not coated and the reflective coating is applied to a background screen 40. A vignetted shadow disc 42 may be utilized in conjunction with the horizon generator to maintain a darkened area at the target silhouette while blending into the lighter background of the illuminated sky. The shadow disc is also positioned and the projected area varied by combined instructions from computer 36 representing the target and training craft positions. In addition, the target supports can be reflectively coated to prevent other undesirable shadows.

A filter 44 having variable transmission and color characteristics can be mounted in front of the background screen to apply different conditions of sky illumination, with the horizon generator intensity being adjusted accordingly. Gradations between black and white can be achieved by use of a neutral density film coating applied to the model. An auxiliary target 46 may also be projected on the screen from a secondary light path 48 inherently provided by the 45° beam splitter arrangement or the latter path can be utilized for the primary target.

An added three-dimensional effect may be achieved on the display screen by applying a polaroid sheet 50, which is divided into two differently oriented polarized halves, over lens 26 and by the pilot's use of polaroid glasses. Each half of the lens inherently receives a full target image. The three-dimensional effect can be improved by further coating lens 26 with an opaque layer having two openings under oppositely polarized halves of the polaroid sheet and spaced at an interocular scale distance. Of course, some image brightness is sacrificed in this instance. It is also possible in a somewhat more complex system to achieve a stereoscopic image effect by use of two projectors and a directive display screen, such as is more fully described in copending application, Serial No. 217,191, filed August 15, 1962, entitled "Stereoscopic Projection Apparatus," by the same inventor and assigned to the same assignee. In still another form, the device may project an image having colored markings thereon. This is achieved by applying a thin coating of transparent colored dye over the reflective layer on predetermined sections of the model.

The system may similarly be applied to other training programs, such as for interplanetary travel wherein a servo controlled star field is used for a background effect, airport traffic control, terrain indentification, or automobile driving. It may thus be seen that the present invention is a novel display system which provides improved brightness, operates with high efficiency, eliminates the need for movable high-power lamps, reduces heat generation, and minimizes shadows from the model supports.

While only a single embodiment has been illustrated, it is apparent that the invention is not limited to exact form or use shown and that many variations may be made in the particular design and configuration without departing from the scope of the invention as set forth in the appended claims.

What is claimed is:
1. An image display system comprising:
means projecting a divergent light beam;
means for transmitting and reflecting said light beam;
movable target means illuminated by said light beam from said transmitting and reflecting means and having a directional light reflective coating returning a convergent beam target image to said transmitting and reflecting means;
said target image being directed by said transmitting and reflecting means toward an observation point;
reflective means associated with said observation point to project said target image; and
display means intercepting and displaying said projected target image from said reflective means.

2. The device of claim 1 wherein said means for transmitting and reflecting said light beam comprises a beam splitter.

3. The device of claim 1 wherein said means projecting said light beam includes optical means to control the size of said beam in accordance with said distance of said target and maintain a predetermined brightness for said target image and display means.

4. The device of claim 3 further including means to control the focus of said target image on said reflective means and display means in accordance with said distance of said target.

5. An image display system comprising:
means projecting a divergent light beam;
means for transmitting and reflecting said light beam;
movable target means illuminated by said light beam from said transmitting and reflecting means and having a directional light reflective coating returning a convergent beam target image to said transmitting and reflecting means;
said target image being directed by said transmitting and reflecting means toward an observation point;
reflective means associated with said observation point to project said target image;
display means intercepting and displaying said projected target image from said reflective means;
means establishing a predetermined course for said target;
control means for simulating the position and movement of said observation point; and
means comparing said simulated position with said target course, said comparing means controlling the movement of said target and angular movement of said reflecting means to display the relative position of said target with respect to said observation point.

6. The device of claim 5 wherein said means for transmitting and reflecting said light beam comprises a beam splitter and said comparing means controls the distance of said target from said beam splitter and the size and attitude of said target image on said display means.

7. The device of claim 6 wherein said means projecting said light beam includes optical means to control the size of said beam in accordance with said distance of said target and maintain a predetermined brightness for said target image and display means.

8. The device of claim 7 including means to control the focus of said target image on said reflective means and display means in accordance with said distance of said target.

9. An image display system comprising:
a light source projecting a divergent beam;
a beam splitter intercepting said beam;
a movable target illuminated by said intercepted beam and having a directional light reflective coating returning a convergent beam target image to said beam splitter, said beam splitter directing said target image toward an observation point;

a pivotable mirror associated with said observation point to project said target image toward a display screen;

a target course generator supplying control signals representing a predetermined target movement and attitude;

a flight attitude simulator supplying control signals representing a reference position and simulating movement of said observation point with respect to said target; and an analogue computer comparing said target and simulator control signals and automatically controlling the distance of said target from said beam splitter and angular position of said mirror to display the relative position and size of said target with respect to said observation point on said screen.

10. The device of claim 9 including a first movable lens positioned in the path of said light beam to automatically control the divergence of said beam in accordance with said distance of said target to maintain a predetermined brightness.

11. The device of claim 10 including a second movable lens intercepting said target image and automatically positioned to control the focus of said target image on said pivotable mirror in accordance with said distance of said target.

12. The device of claim 11 including horizon display means positioning a brightened sky area on said display screen in accordance with the control signals from said flight attitude simulator.

13. The device of claim 11 wherein said beam splitter is positioned at 45° with respect to said light source and illuminates a first target in a path aligned with said light source and a second target in a path at a right angle thereto.

14. The device of claim 11 including a stationary lens positioned between said second movable lens and said beam splitter and polarizing means having two oppositely polarized halves positioned adjacent and intercepting the beam to said stationary lens.

15. The device of claim 12 including shadow forming means associated with said horizon display means to provide a contrasting dark background area surrounding the image of said target.

16. An image display comprising:
means for projecting a divergent light beam;
means for transmitting and reflecting said light beam;
movable target means illuminated by said light beam from said transmitting and reflecting means;

a background screen mounted behind said target means having a directional light reflective coating returning a beam target to said transmitting and reflecting means;

said target image being directed by said transmitting and reflecting means toward an observation point;
reflective means associated with said observation point to project said target image; and
display means intercepting and displaying said projected target image from said reflective means.

17. An image display system comprising:
means projecting a divergent light beam;
means for transmitting and reflecting said light beam;
movable target means illuminated by said light beam from said transmitting and reflecting means;
a background screen mounted behind said target means having a directional light reflective coating returning a beam target image to said transmitting and reflecting means;
said target image being directed by said transmitting and reflecting means toward an observation point;
reflective means associated with said observation point to project said target image;
display means intercepting and displaying said projected target image from said reflective means;
means establishing a predetermined course for said target;
control means for simulating the position and movement of said observation point; and
means comparing said simulated position with said target course, said comparing means controlling the movement of said target and angular movement of said reflective means to display the relative position of said target with respect to said observation point.

References Cited by the Examiner
UNITED STATES PATENTS

| | | | |
|---|---|---|---|
| 2,591,752 | 4/1952 | Wicklund | 35—10.2 X |
| 2,795,164 | 6/1957 | Hendrix | 88—1 |
| 2,866,971 | 12/1958 | Kelleher. | |
| 3,039,204 | 6/1962 | Bryan et al. | 35—10.2 |
| 3,085,469 | 4/1963 | Carlson. | |
| 3,131,487 | 5/1964 | Lyon et al. | |
| 3,134,295 | 5/1964 | Brown et al. | 88—24 |
| 3,151,310 | 9/1964 | Shepherd et al. | 35—110.2 X |

MALCOLM A. MORRISON, *Primary Examiner.*

I. KESCHNER, *Assistant Examiner.*